(12) United States Patent
Hoehn et al.

(10) Patent No.: US 7,803,334 B1
(45) Date of Patent: Sep. 28, 2010

(54) APPARATUS FOR HYDROCRACKING A HYDROCARBON FEEDSTOCK

(75) Inventors: Richard K. Hoehn, Mount Prospect, IL (US); Vasant P. Thakkar, Elk Grove Village, IL (US); Vedula K. Murty, Willowbrook, IL (US); Douglas W. Kocher-Cowan, Lisle, IL (US); Jennifer L. Anderson, Woodstock, IL (US)

(73) Assignee: UOP LLC, Des Plaines, IL (US)

( * ) Notice: Subject to any disclaimer, the term of this patent is extended or adjusted under 35 U.S.C. 154(b) by 364 days.

(21) Appl. No.: 11/456,732

(22) Filed: Jul. 11, 2006

(51) Int. Cl.
*B01J 8/02* (2006.01)
*C10G 47/00* (2006.01)

(52) U.S. Cl. ............... 422/220; 422/228; 422/211; 208/107; 208/108

(58) Field of Classification Search .............. None
See application file for complete search history.

(56) References Cited

U.S. PATENT DOCUMENTS

| | | | | |
|---|---|---|---|---|
| 2,305,104 A | * | 12/1942 | Pardee, Jr. ............... | 568/864 |
| 2,804,292 A | * | 8/1957 | Schilling ................. | 261/114.1 |
| 3,198,847 A | * | 8/1965 | Lanning ................... | 585/488 |
| 3,218,249 A | * | 11/1965 | Ballard et al. ............ | 208/108 |
| 3,524,731 A | * | 8/1970 | Effron et al. ............. | 422/220 |
| 3,591,345 A | * | 7/1971 | Hochman et al. .......... | 422/220 |
| 3,592,612 A | * | 7/1971 | Ballard et al. ............ | 422/191 |
| 4,126,539 A | * | 11/1978 | Derr et al. ................ | 208/108 |
| 4,788,040 A | * | 11/1988 | Campagnolo et al. ...... | 422/220 |
| 5,403,469 A | | 4/1995 | Vauk et al. ................ | 208/78 |
| 5,720,872 A | | 2/1998 | Gupta ....................... | 208/57 |
| 6,183,702 B1 | * | 2/2001 | Nguyen et al. ............ | 422/194 |
| 6,190,535 B1 | | 2/2001 | Kalnes et al. ............. | 208/89 |

* cited by examiner

*Primary Examiner*—Jennifer A Leung
(74) *Attorney, Agent, or Firm*—James C Paschall

(57) ABSTRACT

A hydrocracking process and apparatus wherein the feedstock is hydrotreated and the liquid and gaseous effluent from the hydrotreater is directly introduced into the upper end of a hydrocracking vessel which provides a liquid seal to prevent the passage of the gaseous stream containing hydrogen sulfide and ammonia from the hydrotreater to enter the hydrocracking zone containing hydrocracking catalyst. Fresh hydrogen is then introduced into the hydrocracking zone.

19 Claims, 1 Drawing Sheet

VIEW A-A

US 7,803,334 B1

APPARATUS FOR HYDROCRACKING A HYDROCARBON FEEDSTOCK

FIELD OF THE INVENTION

The field of art to which this invention pertains is the catalytic conversion of a hydrocarbon feedstock to produce useful lower boiling hydrocarbon products by hydrodesulfurization and hydrocracking. An apparatus for hydrocracking a hydrocarbon feedstock is also disclosed.

BACKGROUND OF THE INVENTION

Petroleum refiners produce desirable products such as turbine fuel, diesel fuel and other products known as middle distillates, as well as lower boiling hydrocarbonaceous liquids, such as naphtha and gasoline, by hydrocracking a hydrocarbon feedstock derived from crude oil or heavy fractions thereof. Feedstocks most often subjected to hydrocracking are gas oils and heavy gas oils recovered from crude oil by fractionation. A typical heavy gas oil comprises a substantial portion of hydrocarbon components boiling above about 371° C. (700° F.), usually at least about 50% by weight boiling above 371° C. (700° F.). A typical vacuum gas oil normally has a boiling point range between about 315° C. (600° F.) and about 565° C. (1050° F.).

Hydrocracking is generally accomplished by contacting in a hydrocracking reaction vessel or zone the gas oil or other feedstock to be treated with a suitable hydrocracking catalyst under conditions of elevated temperature and pressure in the presence of hydrogen to yield a product containing a distribution of hydrocarbon products desired by the refiner.

For the most efficient hydrocracking of a hydrocarbonaceous feedstock, the sulfur and nitrogen content must initially be low or significantly reduced prior to the hydrocracking step. The reduction of sulfur and nitrogen is conventionally conducted in a separate hydrotreating process or unit. Because of the existence of two separate reaction zones, i.e., hydrotreating and hydrocracking, the fresh hydrocarbon feed must be pumped up to the required operating pressure and heated to the required temperature for the hydrotreating catalyst. The effluent from the initial hydrotreating stage is depressured so that the product boiling range material can be separated using the appropriate fractionation facilities. The remaining unconverted hydrocarbon feedstock is then pumped again to the operating pressure of the hydrocracking stage and reheated according to the temperature requirements of the second stage hydrocracking catalyst for further conversion. This duplicate pressuring and heating of hydrocarbon feedstock represents energy inefficiency. In addition, additional equipment is required to maintain the separate reaction zones. If the hydrocarbon feed contains significantly large amounts of organic nitrogen, it is necessary to remove the ammonia produced by the first stage hydrotreating reaction zone before the resulting hydrocarbon passes over the hydrocracking catalyst, otherwise the ammonia formed would severely affect the cracking catalyst activity. It is desirable to accomplish the separation of the hydrogen sulfide and ammonia impurities from the hydrotreating reaction zone effluent without having to depressure, fractionate and repressure the streams to the hydrocracking reaction zone.

Although a wide variety of process flow schemes, operating conditions and catalysts have been used in commercial hydrocracking activities, there is always a demand for new hydroprocessing and hydrocracking methods which provide lower costs, more valuable product yields and improved operability.

INFORMATION DISCLOSURE

U.S. Pat. No. 5,403,469 B1 (Vauk et al.) discloses a parallel hydrotreating and hydrocracking process. Effluent from the two processes are combined in the same separation vessel and separated into a vapor comprising hydrogen, and a hydrocarbon containing liquid. The hydrogen is shown to be supplied as part of the feed streams to both the hydrocracker and the hydrotreater.

U.S. Pat. No. 5,720,872 B1 (Gupta) discloses a process for hydroprocessing liquid feedstocks in two or more hydroprocessing stages which are in separate reaction vessels and wherein each reaction stage contains a bed of hydroprocessing catalyst. The liquid product from the first reaction stage is sent to a low pressure stripping stage and stripped of hydrogen sulfide, ammonia and other dissolved gases. The stripped product stream is then sent to the next downstream reaction stage, the product from which is also stripped of dissolved gases and sent to the next downstream reaction stage until the last reaction stage, the liquid product of which is stripped of dissolved gases and collected or passed on for further processing. The flow of treat gas is in a direction opposite the direction in which the reaction stages are staged for the flow of liquid. Each stripping stage is a separate stage, but all stages are contained in the same stripper vessel.

U.S. Pat. No. 6,190,535 B1 (Kalnes et al.) discloses a catalytic hydrocracking process wherein the effluent from the hydrocracking zone is passed into a hot, high pressure stripper. At least a portion of the unconverted feed is recycled to the hydrocracking zone.

BRIEF SUMMARY OF THE INVENTION

In one embodiment, the present invention is a process for hydrocracking a hydrocarbon feedstock to produce valuable lower boiling hydrocarbons. The hydrocarbon feedstock is hydrotreated with hydrogen to remove sulfur and nitrogen to produce hydrogen sulfide and ammonia. The resulting effluent from the hydrotreating zone contains hydrogen, hydrogen sulfide, ammonia and hydrocarbons having a reduced concentration of sulfur and nitrogen. The resulting effluent from the hydrotreating zone is directly introduced into an upper end of a hydrocracking vessel maintained at essentially the same pressure as the hydrotreating zone to produce a generally upwardly flowing gaseous stream comprising hydrogen sulfide, ammonia and hydrogen, and a generally downwardly flowing liquid stream comprising hydrotreated hydrocarbons. The upwardly flowing gaseous stream contains essentially all of the vapor from the hydrotreating zone and is removed from the top of the hydrocracking vessel. A liquid hydrocarbon seal prevents the flow of the vapor to the lower portion of the hydrocracking vessel which holds the hydrocracking catalyst. The downwardly flowing liquid stream comprising hydrotreated hydrocarbons is admixed with a hydrogen rich gaseous stream and the resulting admixture is reacted in a hydrocracking zone containing hydrocracking catalyst. The resulting effluent from the hydrocracking zone is recovered to provide hydrocracked hydrocarbons.

The use of the liquid hydrocarbon seal prevents the hydrogen sulfide and ammonia from contacting the hydrocracking catalyst which has a deleterious effect on the function of the catalyst. The present invention reduces the capital cost of a commercial unit by minimizing the equipment required for an economically viable hydrocracking process.

In another embodiment of the present invention, an apparatus for the hydrocracking of hydrocarbon feedstocks is disclosed.

Other embodiments of the present invention encompass further details, such as detailed descriptions of feedstocks, hydrodesulfurization catalysts, hydrocracking catalysts and preferred operating conditions, all of which are hereinafter disclosed in the following discussion of each of these facets of the invention.

DETAILED DESCRIPTION OF THE INVENTION

Figure 1:
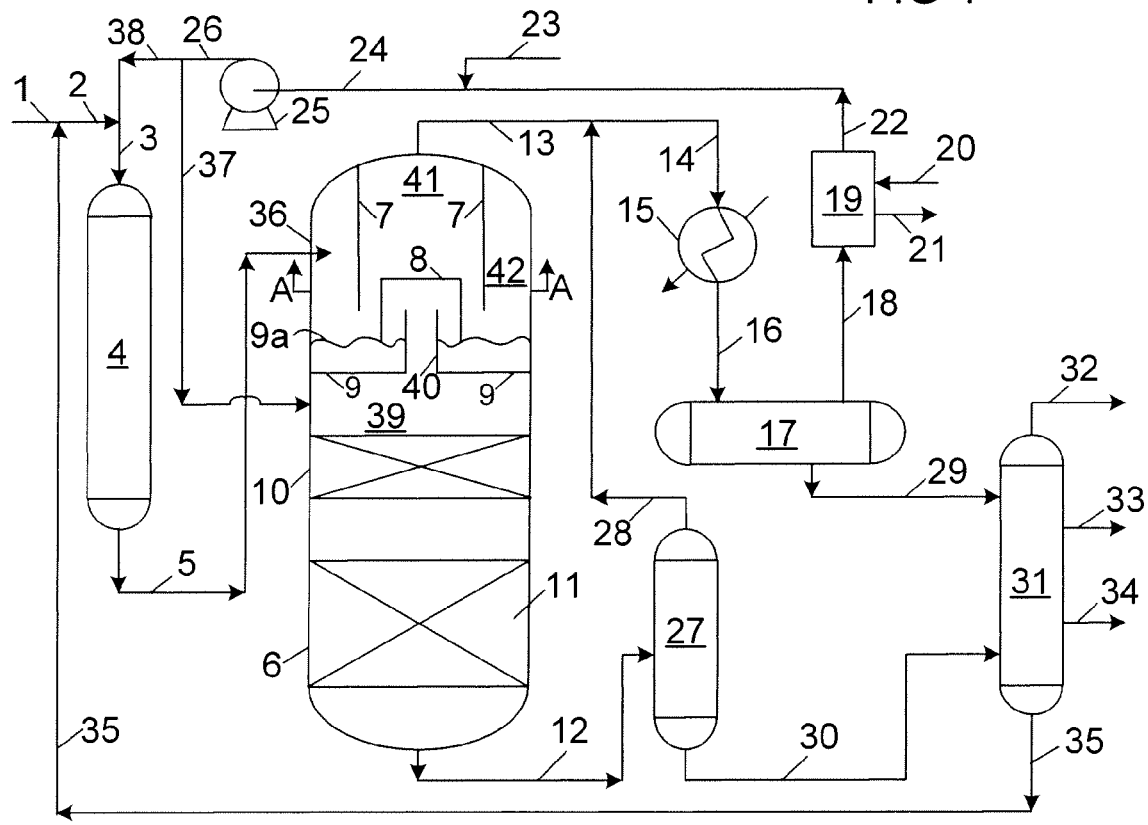
FIG. 1 is a simplified process flow diagram of a preferred embodiment of the present invention.

The present invention is an integrated process for the hydrotreating and hydrocracking of heavy distillate hydrocarbon streams. Preferred feedstocks to the hydrotreating reaction zone include distillate hydrocarbons boiling at a temperature greater than about 371° C. (700° F.). A suitable feedstock is a typical vacuum gas oil normally boiling in the range from about 315° C. (600° F.) to about 565° C. (1050° F.). Distillate hydrocarbon feedstocks are most often recovered from crude oil distillation. However, distillate hydrocarbons may be utilized from any convenient source such as tar sand extract and gas to liquids for example. Furthermore, the distillate hydrocarbon feedstocks may contain from about 0.1 to about 4 weight percent sulfur or from about 0.05 to about 1 weight percent nitrogen.

In one embodiment of the present invention, a selected heavy distillate hydrocarbon feedstock is introduced into a hydrotreating reaction zone together with a hydrogen-rich gaseous stream. Preferred hydrotreating reaction conditions include a temperature from about 260° C. (500° F.) to about 454° C. (850° F.), and a pressure from about 7.0 MPa (1000 psig) to about 17.3 MPa (2500 psig).

Suitable hydrotreating catalysts for use in the present invention are any known convention desulfurization catalysts and include those which are comprised of at least one Group VIII metal, preferably iron, cobalt and nickel, more preferably cobalt and/or nickel and at least one Group VI metal, preferably molybdenum and tungsten, on a high surface area support material, preferably alumina. Other suitable desulfurization catalysts include zeolitic catalysts, as well as noble metal catalysts where the noble metal is selected from palladium and platinum. It is within the scope of the present invention that more than one type of desulfurization catalyst be used in the same reaction vessel. Two or more catalyst beds and one or more quench points may be utilized in the reaction vessel or vessels. The Group VIII metal is typically present in an amount ranging from about 2 to about 20 weight percent, preferably from about 4 to about 12 weight percent. The Group VI metal will typically be present in an amount ranging from about 1 to about 25 weight percent, preferably from about 2 to about 25 weight percent.

The resulting effluent from the hydrotreating reaction zone preferably containing hydrogen sulfide, ammonia and hydrotreated hydrocarbons is directly introduced into an upper end of a hydrocracking vessel maintained at essentially the same pressure as the hydrotreating reaction zone. The effluent from the hydrotreating reaction zone is preferably introduced into the upper end of the hydrocracking vessel in a centrifugal separation zone utilizing a tangential inlet. In another embodiment, the effluent may be introduced into the hydrocracking vessel by means of a distributor.

Regardless of the method of introduction of the reaction zone effluent, the vaporous phase is removed from the overhead of the hydrocracking vessel. The vaporous phase separation is in one embodiment achieved by the use of a circular baffle in conjunction with the wall of the hydrocracking vessel to direct the vaporous phase in a circuitous path to reject entrained hydrocarbon liquid from the exiting vapor. The resulting hydrocarbon liquid phase passes generally downward to a tray or deck to form a hydrocarbon liquid layer thereon. The tray or deck has one or more passageways associated with at least one weir to provide a constant hydrocarbon liquid inventory on the top surface of the tray or deck and to pass hydrocarbon liquid to an area below the tray or deck. The hydrocarbon liquid level on the upper surface of the tray or deck serves as a liquid seal to prevent the passage of vapors containing hydrogen sulfide and ammonia to the hydrocracking catalyst. The liquid level maintaining weir(s) may be any known configuration including bubble caps, for example, which are known to be used on fractionation trays. A sufficient inventory of liquid must be maintained on the deck to ensure that vapor is not passed downwardly to the hydrocracking catalyst.

The liquid hydrocarbons flowing downwardly after passing through the tray or deck are admixed with a hydrogen-rich gaseous stream containing essentially no hydrogen sulfide or ammonia, distributed over the cross section of the hydrocracking vessel and passed to the hydrocracking catalyst in the hydrocracking zone.

The hydrocracking zone may contain one or more beds of the same or different catalyst. In one embodiment the preferred hydrocracking catalysts utilize amorphous bases or low-level zeolite bases combined with one or more Group VIII or Group VIB metal hydrogenating components. In another embodiment the hydrocracking zone contains a catalyst which comprises, in general, any crystalline zeolite cracking base upon which is deposited a minor proportion of a Group VIII metal hydrogenating component. Additional hydrogenating components may be selected from Group VIB for incorporation with the zeolite base. The zeolite cracking bases are sometimes referred to in the art as molecular sieves and are usually composed of silica, alumina and one or more exchangeable cations such as sodium, magnesium, calcium, rare earth metals, etc. They are further characterized by crystal pores of relatively uniform diameter between about 4 and 14 Angstroms. It is preferred to employ zeolites having a silica/alumina mole ratio between about 3 and 12. Suitable zeolites found in nature include, for example, mordenite, stillbite, heulandite, ferrierite, dachiardite, chabazite, erionite and faujasite. Suitable synthetic zeolites include, for example, the B, X, Y and L crystal types, e.g., synthetic faujasite and mordenite. The preferred zeolites are those having crystal pore diameters between about 8-12 Angstroms, wherein the silica/alumina mole ratio is about 4 to 6. A prime example of a zeolite falling in the preferred group is synthetic Y molecular sieve.

The natural occurring zeolites are normally found in a sodium form, an alkaline earth metal form, or mixed forms. The synthetic zeolites are nearly always prepared first in the sodium form. In any case, for use as a cracking base it is preferred that most or all of the original zeolitic monovalent metals be ion-exchanged with a polyvalent metal and/or with an ammonium salt followed by heating to decompose the ammonium ions associated with the zeolite, leaving in their place hydrogen ions and/or exchange sites which have actually been decationized by further removal of water. Hydrogen or "decationized" Y zeolites of this nature are more particularly described in U.S. Pat. No. 3,130,006.

Mixed polyvalent metal-hydrogen zeolites may be prepared by ion-exchanging first with ammonium salt, then partially back exchanging with a polyvalent metal salt and then calcining. In some cases, as in the case of synthetic mordenite, the hydrogen forms can be prepared by direct acid treatment of the alkali metal zeolites. The preferred cracking bases are those which are at least about 10 percent, and preferably at least 20 percent, metal-cation-deficient, based on the initial ion-exchange capacity. A specifically desirable and stable class of zeolites are those wherein at least about 20 percent of the ion exchange capacity is satisfied by hydrogen ions.

The active metals employed in the preferred hydrocracking catalysts of the present invention as hydrogenation components are those of Group VIII, i.e., iron, cobalt, nickel, ruthenium, rhodium, palladium, osmium, iridium and platinum. In addition to these metals, other promoters may also be employed in conjunction therewith, including the metals of Group VIB, e.g., molybdenum and tungsten. The amount of hydrogenating metal in the catalyst can vary within wide ranges. Broadly speaking, any amount between about 0.05 percent and 30 percent by weight may be used. In the case of the noble metals, it is normally preferred to use about 0.05 to about 2 weight percent. The preferred method for incorporating the hydrogenating metal is to contact the zeolite base material with an aqueous solution of a suitable compound of the desired metal wherein the metal is present in a cationic form. Following addition of the selected hydrogenating metal or metals, the resulting catalyst powder is then filtered, dried, pelleted with added lubricants, binders or the like if desired, and calcined in air at temperatures of, e.g., 371°-648° C. (700°-1200° F.) in order to activate the catalyst and decompose ammonium ions. Alternatively, the zeolite component may first be pelleted, followed by the addition of the hydrogenating component and activation by calcining. The foregoing catalysts may be employed in undiluted form, or the powdered zeolite catalyst may be mixed and copelleted with other relatively less active catalysts, diluents or binders such as alumina, silica gel, silica-alumina cogels, activated clays and the like in proportions ranging between 5 and 90 weight percent. These diluents may be employed as such or they may contain a minor proportion of an added hydrogenating metal such as a Group VIB and/or Group VIII metal.

Additional metal promoted hydrocracking catalysts may also be utilized in the process of the present invention which comprises, for example, aluminophosphate molecular sieves, crystalline chromosilicates and other crystalline silicates. Crystalline chromosilicates are more fully described in U.S. Pat. No. 4,363,718 (Klotz).

The hydrocracking of the hydrocarbons in contact with a hydrocracking catalyst is conducted in the presence of hydrogen preferably at hydrocracking reactor conditions which include a temperature from about 260° C. (500° F.) to about 454° C. (850° F.), a pressure from about 7.0 MPa (1000 psig) to about 17.3 MPa (2500 psig), a liquid hourly space velocity (LHSV) from about 0.1 to about 30 $hr^{-1}$, and a hydrogen circulation rate from about 337 notinal $m^3/m^3$ (2000 SCFB) to about 4200 notinal $m^3/m^3$ (25,000 SCFB).

The resulting effluent from the hydrocracking zone is introduced into a hot, vapor-liquid separator operated at a pressure substantially equal to the hydrocracking zone to provide a vaporous stream containing hydrocarbonaceous compounds and hydrogen, and a liquid hydrocarbonaceous stream containing unconverted hydrocarbons boiling in the range of the feedstock which stream is fractionated and at least a portion thereof is recycled to the hydrocracking zone. The vaporous stream containing hydrocarbonaceous compounds is preferably contacted with an aqueous stream to dissolve ammonium salts, partially condensed, and then introduced into a cold high pressure vapor-liquid separator operated at a pressure substantially equal to the hydrocracking zone and a temperature in the range from about 38° C. (100° F.) to about 71° C. (160° F.). An aqueous stream is recovered from the cold vapor-liquid separator. A hydrogen-rich gaseous stream is removed from the cold vapor-liquid separator to provide a majority of the hydrogen introduced into the hydrocracking zone.

In a preferred embodiment of the present invention, the hydrogen-rich gaseous stream is scrubbed with a lean aqueous amine scrubbing solution such as monoethanolamine for example to remove at least a significant portion of the hydrogen sulfide contained therein. Make-up hydrogen may be introduced into the process at any convenient location to replace the hydrogen consumed in the hydrotreating reaction zone and the hydrocracking zone. The liquid hydrocarbonaceous stream is removed from the cold vapor liquid separator and introduced into a fractionation zone to recover hydrocarbon product streams such as gasoline, kerosene and diesel.

DETAILED DESCRIPTION OF THE DRAWINGS

In FIG. 1, the process of the present invention is illustrated by means of a simplified schematic flow diagram in which such details as pumps, instrumentation, heat-exchange and heat-recovery circuits, compressors and similar hardware have been deleted as being non-essential to an understanding of the techniques involved. The use of such miscellaneous equipment is well within the purview of one skilled in the art.

Referring now to FIG. 1, a vacuum gas oil feedstock is introduced into the process via line 1 and joins a liquid hydrocarbon recycle stream provided via line 35 and the resulting admixture is transported via line 2 and admixed with a hydrogen-rich gaseous stream provided via line 38. The resulting mixture is carried via line 3 and introduced into hydrotreating zone 4 which may be a hydrotreating vessel. A resulting effluent from hydrotreating zone 4 is carried via line 5 and introduced into hydrocracking vessel 6. A resulting gaseous phase is passed around baffle 7 and is removed from hydrocracking vessel 6 via line 13 and admixed with a vaporous stream provided via line 28 and the resulting admixture is carried via line 14 and introduced into heat exchanger 15. A resulting cooled and partially condensed stream is removed from heat exchanger 15 via line 16 and introduced into cold vapor liquid separator 17. A hydrogen-rich gaseous stream is removed from cold vapor liquid separator 17 via line 18 and introduced into absorber 19. A lean aqueous amine solution is introduced via line 20 into absorber 19 and is contacted with a flowing gas stream to absorb hydrogen sulfide, and a rich aqueous amine absorption solution containing hydrogen sulfide is removed from absorption zone 19 via line 21 and recovered. A hydrogen-rich gaseous stream having a reduced concentration of hydrogen sulfide is removed from absorption zone 19 via line 22 and is admixed with a makeup hydrogen stream provided via line 23 and the resulting admixture is carried via line 24 and introduced into compressor 25. A resulting compressed hydrogen-rich gaseous stream is removed from compressor 25 via line 26 and a portion is carried via line 38 and is introduced into hydrotreating zone 4 via lines 38 and 3, and another portion is carried via line 37 and introduced into hydrocracking vessel 6. A liquid portion of the stream introduced into hydrocracking vessel 6 by line 5 flows downwardly onto deck 9 and forms a liquid level 9*a* on deck 9 which is maintained by a vertical weir 40. A cap 8 in conjunction with vertical weir 40 prevents the direct liquid flow downwardly past deck 9. The resulting downwardly flowing liquid from deck 9 is admixed in mixing zone 39 with a hereinabove described hydrogen-rich gaseous stream introduced via line 37 and the resulting admixture is uniformly distributed across the entire cross section of hydrocracking vessel 6 by means of distributor 10. A uniform admixture of liquid hydrocarbon and hydrogen moves downwardly from distributor 10 and is introduced into hydrocracking zone 11. A resulting hydrocracking zone effluent is removed from hydrocracking vessel 6 via line 12 and introduced into hot vapor liquid separator 27. A vaporous stream is removed from hot vapor liquid separator 27 via line 28 and joins line 13 as hereinabove described. A liquid stream is removed from hot vapor liquid separator 27 via line 30 and introduced into a fractionation zone 31. A liquid hydrocarbonaceous stream is removed from cold vapor liquid separator 17 via line 29 and also introduced into fractionation zone 31. A light low boiling hydrocarbonaceous stream is removed from fractionation zone 31 via line 32 and recovered. A gasoline boiling range hydrocarbon stream is removed from fractionation zone 31 via line 33 and recovered. A diesel boiling range hydrocarbon is removed from fractionation zone 31 via line 34 and recovered. A liquid hydrocarbonaceous stream containing unconverted hydrocarbons is removed from fractionation zone 31 via line 35 and is admixed with the fresh feedstock introduced via line 1 as hereinabove described.

Figure 2:
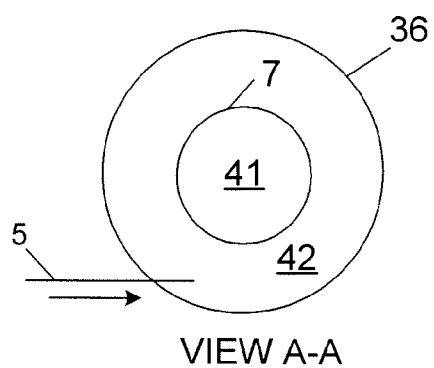
FIG. 2 is a cross-sectional view of the upper end of a hydrocracking reaction vessel.

FIG. 2 is a cross-sectional view, A-A, of the upper end of hydrocracking vessel 36. A stream containing liquid and vapors is carried via line 5 and is tangentially introduced into annular space 42. Annular space 42 is defined by outer wall 36 and baffle 7. A resulting vapor stream is removed upwardly through conduit 41 and resulting liquid moves downwardly from conduit 41.

The foregoing description and drawings clearly illustrate the advantages encompassed by the process of the present invention and the benefits to be afforded with the use thereof.

What is claimed is:

1. An apparatus for hydrocracking a hydrocarbon feedstock comprising:
   a) a generally vertical vessel having an upper end and a lower end;
   b) a generally vertical baffle attached to the upper end of the vessel, said baffle defining a conduit with a free lower edge to allow a gaseous phase to pass around said free lower edge and into said conduit;
   c) a tangential inlet to a space between the baffle and an outer wall of the vessel at the upper end of the vessel;
   d) a generally horizontal deck positioned in the upper end of the vessel and below the vertical baffle having at least one perforation; and
   e) a generally vertical weir associated with said at least one perforation in the horizontal deck.

2. The apparatus of claim 1 comprising an outlet positioned in the upper end of the vessel.

3. The apparatus of claim 1 comprising an outlet positioned in the lower end of the vessel.

4. The apparatus of claim 1 wherein the space between the baffle and the outer wall is annular.

5. The apparatus of claim 1 comprising an inlet distributor.

6. The apparatus of claim 1 comprising a cap positioned above each vertical weir.

7. The apparatus of claim 1 comprising a mixing zone positioned below the horizontal deck.

8. An apparatus for hydrocracking a hydrocarbon feedstock comprising:
   a) a generally vertical vessel having an upper end and a lower end;
   b) a generally vertical baffle attached to the upper end of the vessel and defining an annular space and a conduit with a free lower edge to allow a gaseous phase to pass around said free lower edge and into said conduit;
   c) an inlet in the annular space in the upper end of the vessel;
   d) a generally horizontal deck positioned in the upper end of the vessel and below the vertical baffle having at least one perforation;
   e) a generally vertical weir associated with each of said at least one perforation in the horizontal deck; and
   f) an outlet for removing a stream from the upper end of the vessel.

9. The apparatus of claim 8 wherein a hydrocracking catalyst zone is positioned below a mixing zone.

10. The apparatus of claim 8 wherein the inlet is a tangential inlet.

11. The apparatus of claim 8 comprising an outlet positioned in the lower end of the vessel.

12. The apparatus of claim 8 comprising a cap positioned above each vertical weir.

13. The apparatus of claim 8 comprising a mixing zone positioned below the horizontal deck.

14. An apparatus for hydrocracking a hydrocarbon feedstock comprising:
   a) a generally vertical vessel having an upper end and a lower end;
   b) a generally vertical baffle attached to the upper end of the vessel, said baffle defining a conduit with a free lower edge to allow a gaseous phase to pass around said free lower edge and into said conduit;
   c) a first inlet in the upper end of the vessel;
   d) a generally horizontal deck positioned in the upper end of the vessel and below the vertical baffle having at least one perforation;
   e) a generally vertical weir encircling said at least one perforation in the horizontal deck;
   f) a second inlet to a mixing zone below the deck; and
   g) a distributor below the second inlet and the mixing zone.

15. The apparatus of claim 14 wherein the first inlet is a tangential inlet.

16. The apparatus of claim 14 comprising an outlet positioned in the upper end of the vessel.

17. The apparatus of claim 14 comprising an outlet positioned in the lower end of the vessel.

18. The apparatus of claim 14 comprising a cap positioned above each vertical weir.

19. The apparatus of claim 14 comprising a hydrocracking zone positioned below the mixing zone.

* * * * *